United States Patent
Chen et al.

(10) Patent No.: US 7,795,744 B2
(45) Date of Patent: Sep. 14, 2010

(54) CATIONICALLY CURABLE EPOXY RESIN COMPOSITION

(75) Inventors: Chunfu Chen, Yokohama (JP); Yoke Ai Gan, Yokohama (JP)

(73) Assignee: Henkel Corporation, Rocky Hill, CT (US)

( * ) Notice: Subject to any disclaimer, the term of this patent is extended or adjusted under 35 U.S.C. 154(b) by 812 days.

(21) Appl. No.: 10/596,611

(22) PCT Filed: Dec. 16, 2004

(86) PCT No.: PCT/JP2004/018790

§ 371 (c)(1),
(2), (4) Date: Apr. 24, 2007

(87) PCT Pub. No.: WO2005/059002

PCT Pub. Date: Jun. 30, 2005

(65) Prior Publication Data

US 2007/0208106 A1 Sep. 6, 2007

(30) Foreign Application Priority Data

Dec. 19, 2003 (JP) ............................ 2003-422885

(51) Int. Cl.
*H01L 23/29* (2006.01)
*C08L 63/00* (2006.01)
*B32B 27/20* (2006.01)
*B32B 27/26* (2006.01)
*B32B 27/38* (2006.01)

(52) U.S. Cl. ...................... 257/793; 257/788; 257/789; 257/795; 523/445; 523/451; 523/453; 523/457

(58) Field of Classification Search ...................... None
See application file for complete search history.

(56) References Cited

U.S. PATENT DOCUMENTS

| 4,836,832 A | * | 6/1989 | Tumey et al. ................. 51/293 |
| 5,730,764 A | * | 3/1998 | Williamson et al. ........... 51/295 |
| 6,037,043 A | | 3/2000 | Lehner et al. |

FOREIGN PATENT DOCUMENTS

| JP | 5-171084 | 7/1993 |
| JP | 9-80251 | 3/1997 |
| JP | 10-101904 | 4/1998 |
| JP | 11-116659 | 4/1999 |
| JP | 2001-261780 | 9/2001 |
| JP | 2003-238770 | 8/2003 |
| JP | 2003-327785 | 11/2003 |
| WO | WO 03/095554 | 11/2003 |

OTHER PUBLICATIONS

Machine translation of JP 05-171084 A, provided by the JPO website (1993).*
Machine translation of JP 09-080251 A, provided by the JPO website (1997).*

* cited by examiner

*Primary Examiner*—Michael J Feely
(74) *Attorney, Agent, or Firm*—Steven C. Bauman

(57) ABSTRACT

The objective of the present invention is to provides a cationically curable epoxy resin composition excellent in sealing and adhesive property specifically to glass, excellent reflow resistance property, moisture resistance and water resistance while keeping a good workability intrinsic to a light curable resins. The invention provides a cationically curable epoxy resin composition comprising: (a) an epoxy resin component; (b) a cationic photo-initiator; (c) a cationic thermal-initiator and (d) a filler selected from the group consisting of oxides, hydroxides and carbonates containing a Group II element in the long periodic table.

11 Claims, No Drawings

CATIONICALLY CURABLE EPOXY RESIN COMPOSITION

FIELD OF THE INVENTION

This is a national stage application of PCT/JP04/18790, filed Dec. 16, 2004, which claims foreign priority to Japanese Application No. 2003-422885, filed Dec. 19, 2003.

This invention relates to an epoxy resin composition curable by cationic polymerization induced by photoirradiation and heating.

BACKGROUND ART

Conventionally, thermosetting-type (anionically curable type) epoxy resins are commonly used as adhesives. In order to meet with various applications, cationically photocurable epoxy resin compositions which can be cured by cationic polymerization of an epoxy resin induced by photo irradiation has been developed. This type of resin composition is adavantegeous in that it provides cured products having physical properties comparable with those from a thermosetting composition, it can be less inhibited by oxygen than a radical UV curable composition, and it exhibits a smaller shrinkage than a radical UV curable composition. It has been, therefore, used in various well-known applications such as a liquid crystal display, lamination in a digital video disk, and sealing of a device package.

For example, for the formation of a device with hollow packages, such as CMOS, a device is placed in a plastic or ceramic packages, then the upper part is sealed with a glass plate by UV curable type adhesives. With regard to the properties required, these adhesives have to have, in addition to the sealing and adhesive property with glass, excellent moisture resistance, water resistance, and storage stability both in high temperature and low temperature from the point of heat cycle and heat shock which a semiconductor device receives in a reflow furnace and the like and reliability over a long period.

In JP Laid-open No. 2003-327785 (Patent Document 1), we have disclosed a resin composition comprising an epoxy resin component comprising an alicyclic epoxy resin and an aromatic-ring containing epoxy resin, a cationic photoinitiator component and a filler selected from the group consisting of oxides, hydroxides and carbonates containing a Group II element in the periodic table. However, adhesives having more suitable properties for package application are demanded.

Also known in the art is thermally curable epoxy resin compositions which can be cured by cationic polymerization by the application of heat. For example, claim 1 of JP Laid-open No. 2003-238770 discloses "a epoxy resin composition for manufacture of inkjet head, which contains an alicyclic epoxy resin and/or bisphenol type epoxy resin as an epoxy resin, a photo-cationic polymerization initiator and/or thermo-cationic polymerization initiator as a curing agent, and at least an organosilicon compound as an additive wherein the organosilicon compound is the one which produces a silanol group upon light irradiation and/or heating and/or hydrolysis". However, no specific example is disclosed in which both of photo-cationic polymerization initiator and thermo-cationic polymerization initiator are used. In addition, this document is directed to the composition for the specific application use where the durability to ink is enhanced by the use of a specific organosilicon compounds.

List of Documents
Patent Document 1: JP Laid-open No.2003-327785
Patent Document 2: JP Laid-open No.2003-238770

SUMMARY OF THE INVENTION

The objective of the present invention is to provides a cationically curable epoxy resin composition excellent in sealing and adhesive property specifically to glass, excellent reflow resistance property, moisture resistance and water resistance while keeping a good workability intrinsic to a light curable resins.

In accordance with the present invention, there is provided a cationically curable epoxy resin composition comprising (a) an epoxy resin component; (b) a cationic photo-initiator; (c) a cationic thermal-initiator and (d) a filler selected from the group consisting of oxides, hydroxides and carbonates containing a Group II element in the long periodic table.

In the past, there has been no technical concept which uses both a cationic photo-initiator and a cationic thermal-initiator simultaneously because both are the same in that they produce cations as polymerization active species. Surprisingly, however, the use of the both in combination, further together with the use of a inorganic filler containing a, Group II element, especially in the form of oxide, hydroxide or carbonate, has improved such properties of the adhesives as water resistance, heat cycle and the like.

A cationically curable epoxy resin composition of the present invention is especially useful as an adhesive when at least one of two materials to be attached is a glass, particularly as an adhesive for semiconductor device package such as CMOS, CCD and the like.

DETAILED DESCRIPTION OF THE INVENTION

As described above, a cationically curable epoxy resin composition of the present invention comprises at least (a) an epoxy resin component; (b) a cationic photo-initiator; (c) a cationic thermal-initiator and (d) a filler selected from the group consisting of oxides, hydroxides and carbonates containing a Group II element in the long periodic table.

The epoxy resin component comprises aromatic-ring containing epoxy resin as main component and optionally may comprise alicyclic epoxy resin. Although a fluorinated epoxy resin may not be necessarily excluded from epoxy resins used in the epoxy resin component, there is no need to incorporate it in the present composition. In one embodiment of this invention, a non-fluorinated epoxy resin is used as a main ingredient, i.e., at least 60% by weight, preferably at least 80% by weight of the epoxy resin component. In particular, it is also preferable to use at least 60% by weight, particularly at least 80% by weight of a non-fluorinated resin in an aromatic-ring containing epoxy resin. In the most preferable embodiment, all the epoxy resins are non-fluorinated resins.

Examples of the aromatic-ring containing epoxy resin include bisphenol epoxy resins such as bisphenol-A epoxy resins, bisphenol-F epoxy resins and bisphenol-S epoxy resins, novolac epoxy resins such as phenol novolac epoxy resins and cresol novolac epoxy resins; and biphenyl epoxy resins such as YX4000 (trade mark; Japan Epoxy Resin Co. Ltd.). The aromatic-ring containing epoxy resin usually has at least one epoxy group in one molecule. The epoxy equivalent of the resin may be selected as appropriate.

An alicyclic epoxy resin is used optionally as co-component with the aromatic-ring containing epoxy resin. It includes those having epoxy group associated with a structure having ring distortion such as a cyclohexene oxide and a cyclopentene oxide structures in molecule; preferably those having two or more of this type of epoxy group in one molecule. Typical examples of the alicyclic epoxy resin include those represented by formulas (1) to (5).

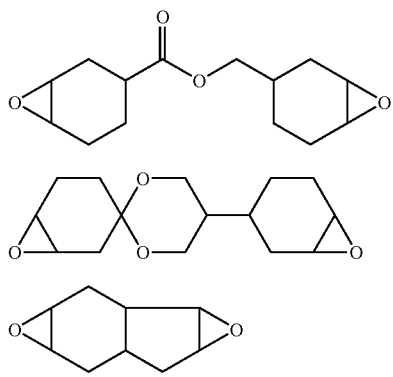

(1)

(2)

(3)

(4)

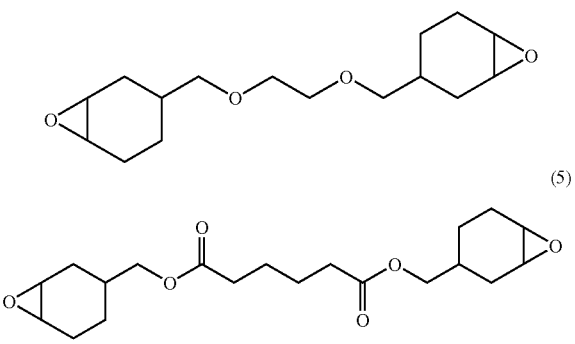

(5)

In an aspect of the present invention., at least an epoxy resin selected from the group consisting of hydrogenated bisphenol type epoxy resins and dicyclopentadiene type epoxy resins is used as the epoxy resin component. Hereinafter, the epoxy resin(s) selected herewith is referred as "rapid curable epoxy resin(s)". The use of these epoxies are found to increase curing rate of the resin system of the present invention dramatically and be effective to cure it with short period of UV radiation. While it is known in the art that the use of alicyclic epoxy resin increases curing rate of UV cationic system, it deteriorate the adhesiveness of the system. On the contrary, the use of the epoxy resin defined herewith increases the curing rate while maintaining good adhesive properties.

The rapid curable epoxy resins may constitute the whole of the epoxy resin component or may be used with the above-mentioned aromatic-ring containing epoxy resin, optionally with alicyclic epoxy resin. In order to make the effect notable, i.e. small amount of UV radiation and the rapid curing effect, it is preferably used in the amount of 10% by weight or more, particularly 30% by weight or more based on the total amount of the epoxy resin component.

Hydrogenated bisphenol epoxy resins are compounds obtainable by hydrogenating benzene-rings in bisphenol epoxy resins such as bisphenol-A epoxy resins, bisphenol-F epoxy resins, bisphenol-S epoxy resins and the like. Hydrogenated bisphenol-A epoxy resin is represented by the following formula:

The above compound is generally obtained as a mixture with different number n and the average of n is 0 to about 5, for example 0 to about 2, particularly in the range of 0 to 1.

Dicyclopentadiene type epoxy resin is represented by the following formula:

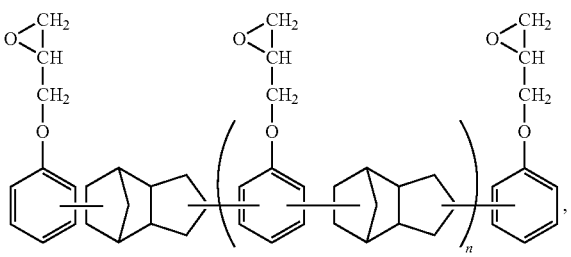

and is generally obtained as a mixture with different number n and the average of n is 0 to about 5, for example 0 to about 2, particularly in the range of 0 to 1.

The epoxy resin component may comprise other known diluents which may be epoxy-containing compounds, vinyl ethers, oxetane compounds, polyols and the like.

The examples of epoxy-containing compound used as diluents include aliphatic alkyl mono- or di-glycidyl ethers such as cyclohexanedimethanol diglycidyl ether, butyl glycidyl ether, 2-ethylhexyl glycidyl ether and allyl glycidyl ether; alkyl glycidyl esters such as glycidyl methacrylate and tertiary carboxylic acid glycidyl esters; styrene oxide; aromatic alkyl monoglycidyl ethers such as phenyl glycidyl ether, cresyl glycidyl ether, p-s-butylphenyl glycidyl ether and nonylphenyl glycidyl ether; tetrahydrofurfuryl alcohol glycidyl ether.

The examples of vinyl ether used as diluents include mono- or poly-functional vinyl ethers such as cyclohexanedimethanol divinyl ether, triethleneglycol divinyl ether and hydroxybutyl vinyl ether.

The examples of oxetane compound include a compound represented by formula (6):

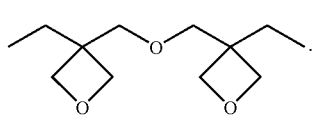

(6)

Polyols are effective in increasing the adhesiveness of the resin system of the present invention in addition to the function as diluents; and include alkyl polyols, polyester polyols, polyether polyols, acrylic polyols, polybutadiene polyols and phenolic polyols. Among these, alkyl polyols, polyester polyols and polyether polyols are preferable and particularly polyether polyols are preferable. When used to increase the adhesiveness, polypols are included in the amount of 0.1 to 40 parts by weight, preferably 2 to 15 parts by weigh to the 100 parts by weight of the epoxy component excluding the amount of polypols.

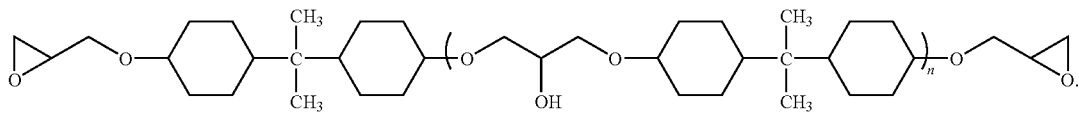

The examples of alkyl polyols include ethylene glycol, 1,4-butanediol, 1,6-hexanediol, 1,8-octanediol, neopentylglycol, cyclohexanedimethanol, trimethylolpropane, pentaerythritol and the like.

The examples of polyester polyols include condensation-type polyester polyols, addition-polymerization polyester polyols, polycarbonate polyols and the like. Condensation-type polyester polyols may be obtained by condensation reaction of diol compounds, such as ethylene glycol, propylene glycol, diethylene glycol, 1,4-butanediol, neopentyl glycol, 1,6-hexane diol, 3-methyl-1,5-pentanediol, 1,9-nonanediol, 1,4-hexanedimethanol, dimer-acid diol and polyethylene glycol, and organic polybasic acid, such as adipic acid, isophthalic acid, terephthalic acid and sebacic acid, and the molecular weight is preferably 100 to 100,000. Addition-polymerization polyester polyols may include polycaprolactones and the molecular weight thereof is preferably 100 to 100,000. Polycarbonate polyols may be prepared by the direct phosgenation or the ester-exchange method with diphenylcarbonate, each from polyols. The molecular weight thereof is preferably 100 to 100,000.

The examples of polyether polyols include PEG-type, PPG-type, PTO-type and the like, PEG-type polyols are obtainable by the addition polymerization of ethylene oxide using a compound having active hydrogen as a reaction initiation material; and the molecular weight thereof is preferably 100 to 100,000. PPG-type polyols are obtainable by the addition polymerization of propylene oxide using a compound having active hydrogen as a reaction initiation material; and the molecular weight thereof is preferably 100 to 100,000. PTG-type polyols are obtainable by the cationic polymerization of tetrahydrofuran; and the molecular weight thereof is preferably 100 to 100,000.

The cationic photo-initiator is a salt represented by $A^+B^-$ which produces cationic active species by irradiation of light. The cation $A^+$ is preferably an aromatic iodonium ion or aromatic sulfonium ion. In the aromatic iodonium ion, as represented by the formula:

$$Ar^1—I^+—Ar^2,$$

groups $Ar^1$ and $Ar^2$ attached to $I^+$ are, independently each other, preferably aromatic groups, particularly phenyl groups optionally having substituent group.

In the aromatic sulfonium ion, as represented by the formula:

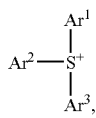

groups $Ar^1$, $Ar^2$ and $Ar^3$ attached to central $S^+$ are, independently each other, preferably aryl groups, particularly phenyl groups optionally having substituent group.

The composition according to this invention preferably further comprises at least an initiator in which the anion $B^-$ is $SbF_6^-$ or $B(aryl)_4^-$ ion such as $B(C_6F_5)_4^-$ (hereinafter, referred to as "the first initiator"). The $B(aryl)_4^-$ ion may be, in addition to $B(C_6F_5)_4^-$, $B(C_6F_4OCF_3)_4^-$ or $B(C_6F_4CF_3)_4^-$. The examples of the compounds include the compounds represented by the following formulae.

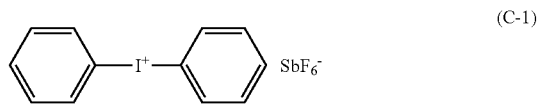

(C-1)

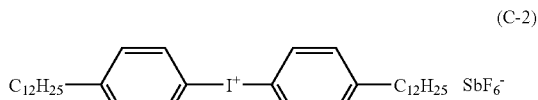

(C-2)

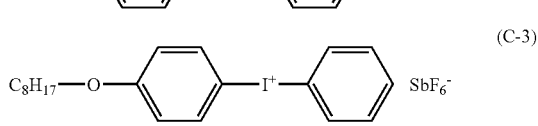

(C-3)

(C-4)

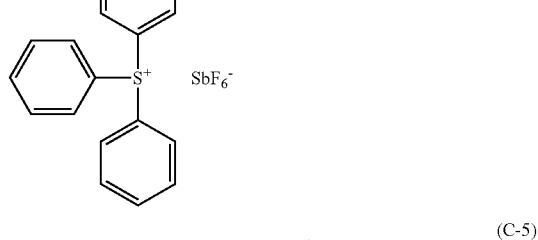

(C-5)

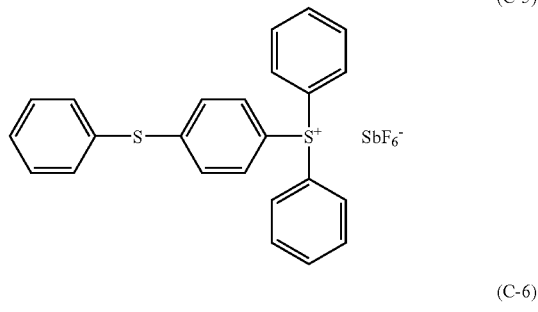

(C-6)

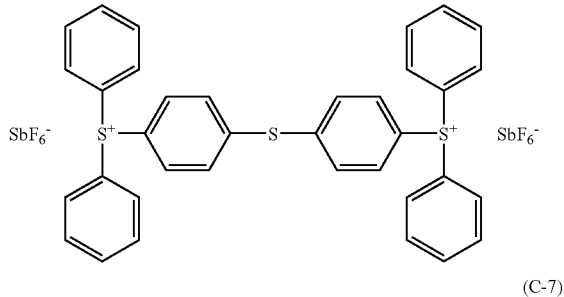

(C-7)

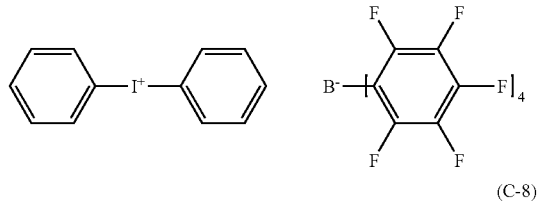

(C-8)

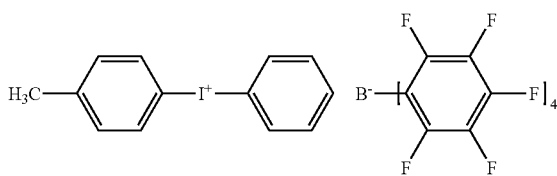

-continued

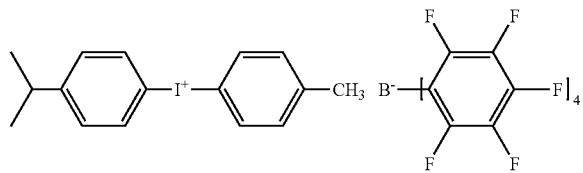

(C-9)

An initiator in which the anion B⁻ is $SbF_6^-$ or a $B(aryl)_4^-$ ion provides a higher curing rate. In addition to the above-mentioned initiator, an additional initiator in which the anion B⁻ is an anion other than $SbF_6^-$ or a $B(aryl)_4^-$ ion may be added. These initiators has an advantage of improving adhesive strength, despite that it exhibits a low curing rate in comparison with the first initiator. Therefore, it can be used in combination with the above-mentioned initiators having $SbF_6^-$ or $B(aryl)_4^-$ as anion B⁻. The examples of the anion B⁻ in the additional initiator include $PF_6^-$, $AsF_6^-$ and $BF_4^-$. The examples of compound include those that $SbF_6^-$ in the above-mentioned salts is replaced with $PF_6^-$, $AsF_6^-$ or $BF_4^-$.

A cationic photoinitiator is preferably added, for example, in an amount of 0.1 parts by weight to 10 parts by weight, preferably 0.5 parts by weight to a parts by weight to 100 parts by weight of the epoxy resin component. It is also preferable to add a photosensitizer such as thioxanthone as necessary.

The cationic thermal-initiator is a salt which produces cationic active species by heat while it does not produce cationic active species by irradiation of light, and represented by $A^+B^-$ too. The temperature for producing the cationic active species is 60° C. (degrees centigrade) to 180° C. (degrees centigrade), preferably 80° C. (degrees centigrade) to 150° C. (degrees centigrade). Most preferred is a sulfonium ion in which at least one among three groups bonding to the S-atom is alkyl group. Alternatively, two among three groups bonding to the S-atom form together an alkylene group to form a ring with the S-atom. The other groups may be preferably aryl, or alkyl group or alkenyl group which may be optionally substituted with aryl.

Specifically, when expressed by the formula:

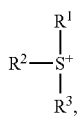

(H-1)

at least one among $R^1$, $R^2$ and $R^3$ bonding to the S-atom is an alkyl group.

In preferred cation $A^+$ as represented by formula (H-1), $R^1$ is phenyl or naphthyl, each optionally containing substituent; $R^2$ is alkyl having 1 to 8 carbon atoms; and $R^3$ is phenyl or naphthyl, each optionally containing substituent, alkyl optionally containing substituent, cyclo alkyl, alkenyl optionally containing substituent, or 2-indanyl.

More specifically, $R^1$ is phenyl or naphthyl, each optionally containing substituent wherein the substituent may be selected from alkyl having about 1 to 18 carbon atoms such as methyl, ethyl, propyl, isopropyl, butyl, isobutyl, t-butyl, pentyl, hexyl and the like; alkoxy having about 1 to 18 carbon atoms such as methoxy, ethoxy, propoxy, butoxy, hexyloxy, decyloxy, dodecyloxy and the like; carbonyl such as acetoxy, propyonyloxy, decylcarbonyloxy, dodecylcarbonyloxy, methoxycarbonyl, ethoxycarbonyl, benzoyloxy and the like; phenylthio; hologen such as fluorine, chlorine, bromine, iodine; cyano; nitro; hydroxy and the like.

$R^2$ represents alkyl having 1 to 18 carbon atoms such as methyl, ethyl, propyl, isopropyl, butyl, isobutyl, pentyl, hexyl and the like.

When $R^3$ is phenyl or naphthyl, each optionally containing substituent, the substituent may be selected from alkyl having about 1 to 18 carbon atoms such as methyl, ethyl, propyl, isopropyl, butyl, isobutyl, t-butyl, pentyl, hexyl and the like; alkoxy having about 1 to 18 carbon atoms such as methoxy, ethoxy, propoxy; butoxy, hexyloxy, decyloxy, dodecyloxy and the like; carbonyl such as acetoxy, propyonyloxy, decylcarbonyloxy, dodecylcarbonyloxy, methoxycarbonyl, ethoxycarbonyl, benzoyloxy and the like; phenylthio; hologen such as fluorine, chlorine, bromine, iodine; cyano; nitro; hydroxy and the like.

When $R^3$ is alkyl optionally containing substituent, the number of carbon atoms in the alkyl chain is preferably 1 to 18, more preferably 1 to 12, most preferably 1 to 6. The substituent includes alkoxy such as methoxy, ethoxy, propoxy, butoxy, hexyloxy, decyloxy, dodecyloxy and the like; carbonyl such as acetoxy, propyonyloxy, decylcarbonyloxy, dodecylcarbonyloxy, methoxycarbonyl, ethoxycarbonyl, benzoyloxy and the like; phenylthio; hologen such as fluorine, chlorine, bromine, iodine; cyano; nitro; hydroxy, phenyl and the like.

When $R^3$ is cycloalkyl, the number of carbon atoms thereof is preferably 3 to 12; the examples thereof include cyclohexyl, cyclohexanonyl, cyclopentyl, 1-acenaphthenyl, bicyclononyl, norbornyl, coumarinyl, dihydrobenzofuranyl, camphor group, and the like.

When $R^3$ is alkenyl optionally containing substituent, the number of carbon atoms in the alkenyl chain is preferably 1 to 18, more preferably 1 to 12, most preferably 1 to 6. The substituent includes alkoxy such as methoxy, ethoxy, propoxy, butoxy, hexyloxy, decyloxy, dodecyloxy and the like; carbonyl such as acetoxy, propyonyloxy, decylcarbonyloxy, dodecylcarbonyloxy, methoxycarbonyl, ethoxycarbonyl, benzoyloxy and the like; phenylthio; hologen such as fluorine, chlorine, bromine, iodine; cyano; nitro; hydroxy, phenyl and the like. Particularly, alkenyl having the structure of the 2-alken-1-yl is preferred.

The other preferred cation $A^+$ is a compound represented by the following formula H-2:

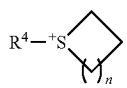

(H-2)

wherein, n is 1 to 3, preferably 2; $R^4$ is phenyl or naphthyl, each optionally containing substituent; alkyl optionally containing substituent; cyclo alkyl; alkenyl optionally containing substituent or 2-indanyl. Specific examples include those already mentioned as $R^3$ in formula H-1.

The examples of anion B⁻ in the cationic thermal-initiator include $SbF_6^-$, $PF_6^-$, $AsF_6^-$, $BF_4^-$, $B(aryl)_4^-$ ion and the like. It is preferably $SbF_6^-$, $PF_6^-$ or $BF_4^-$, most preferably $SbF_6^-$.

The specific examples of the cationic thermal-initiator include the following structure. In the formulae, X⁻s represent anion B⁻s.

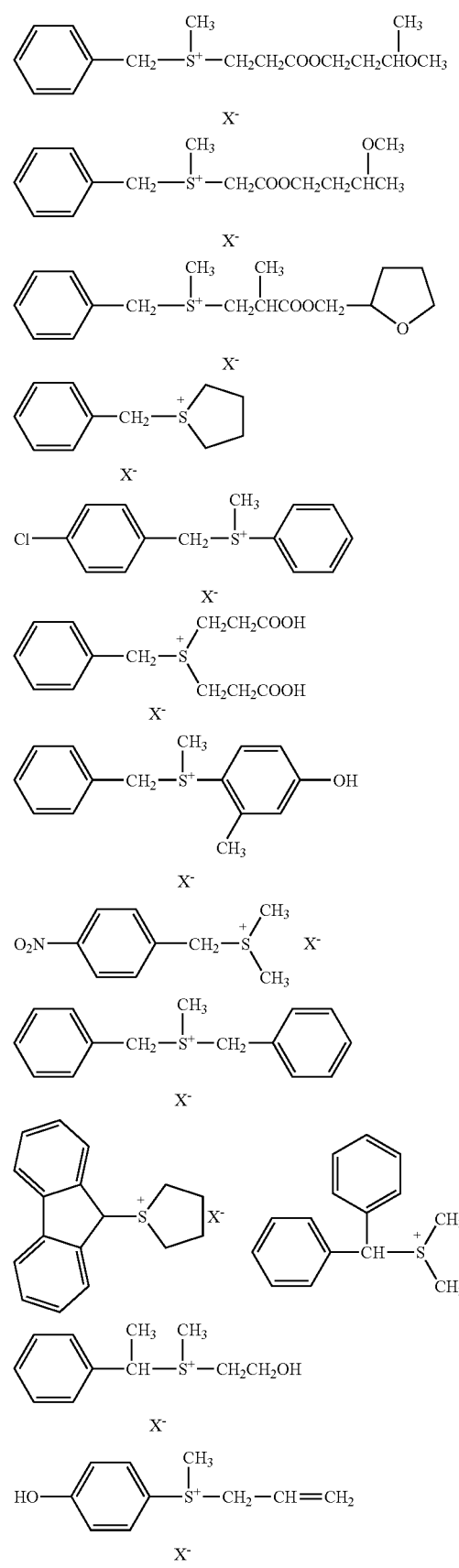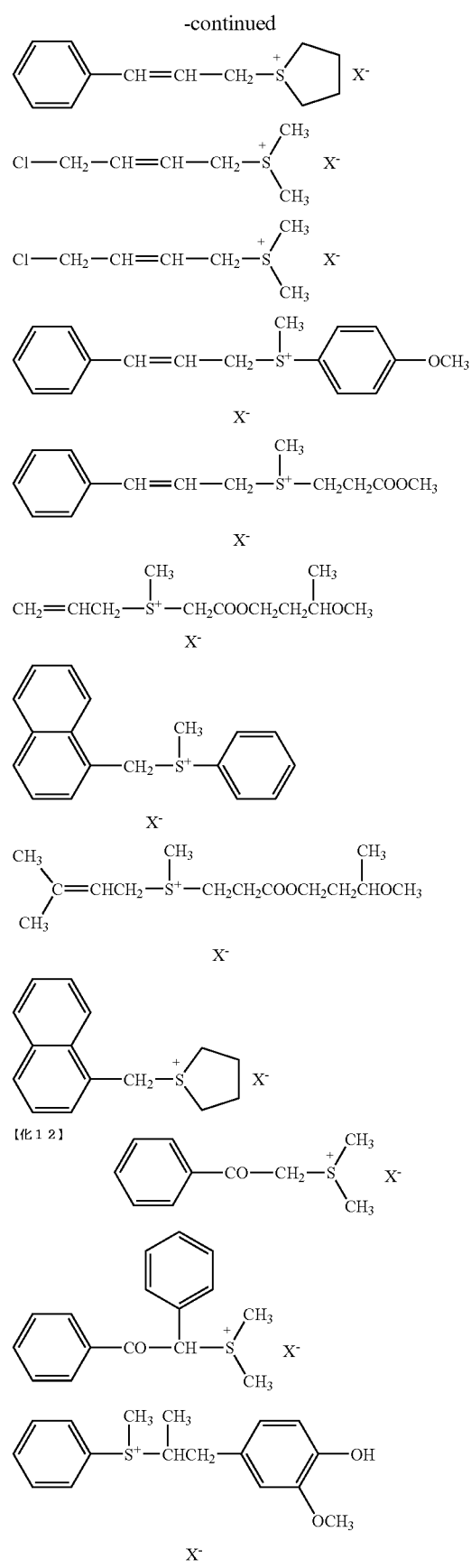

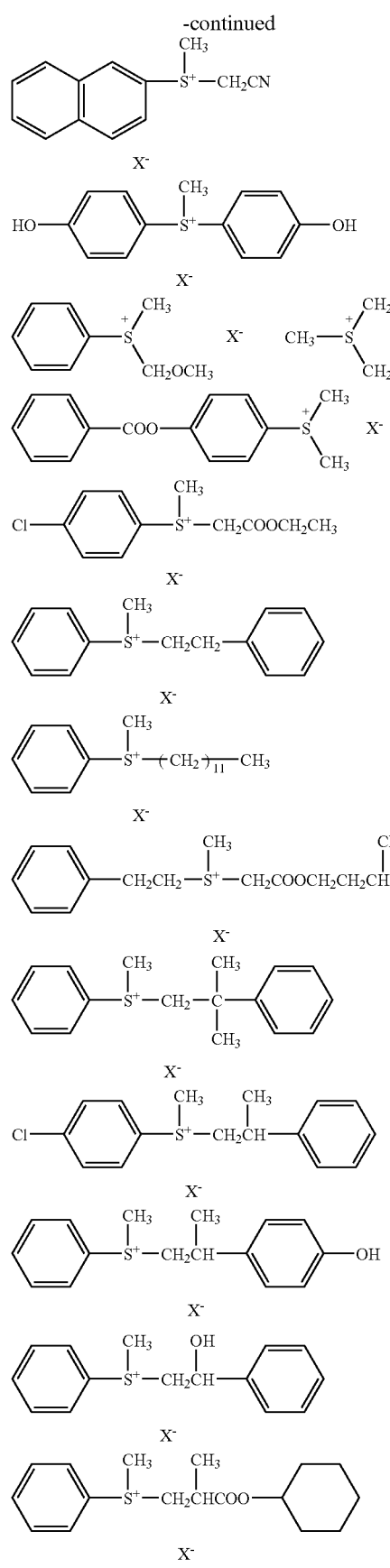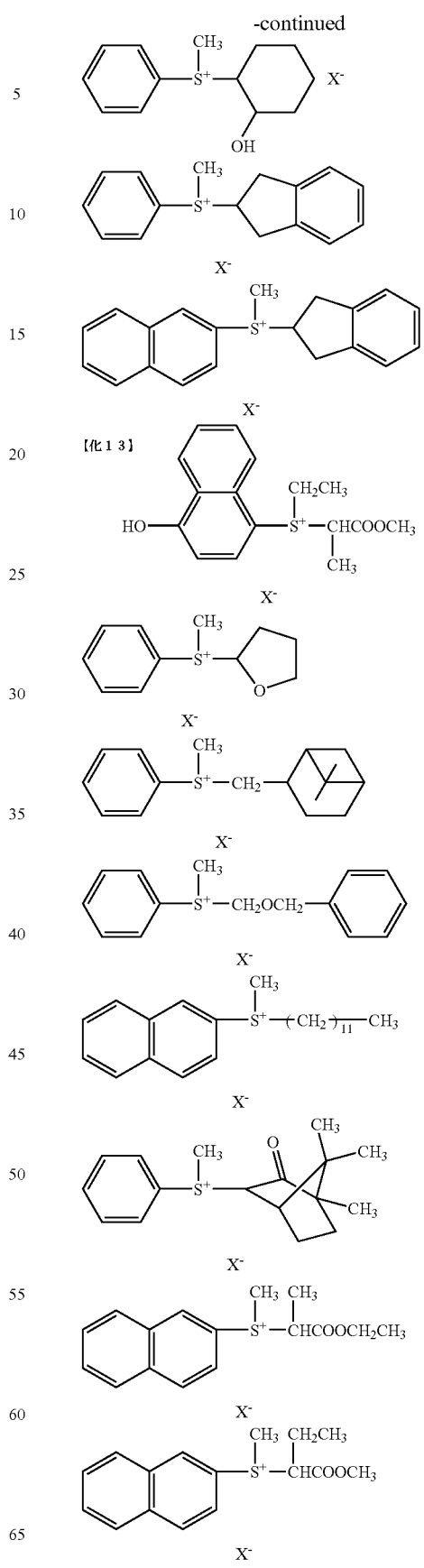

-continued

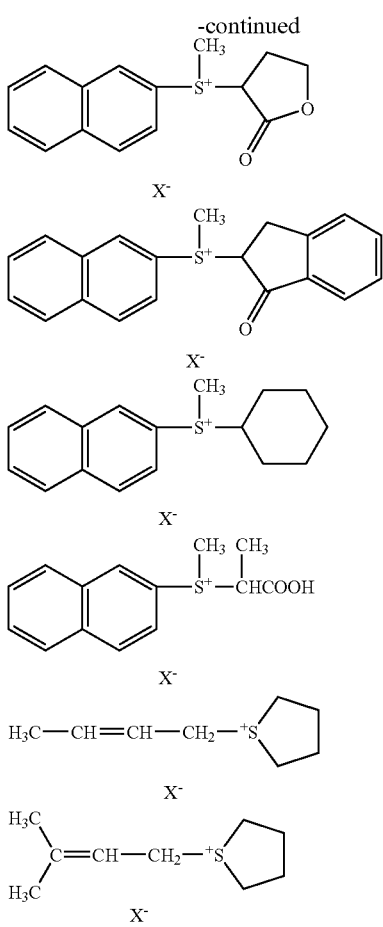

The cationic thermal-initiator is present in the composition in an amount of, for example, 0.01 to 5 parts by weight, preferably 0.1 to 3 parts by weight to 100 parts by weight oil the epoxy resin component.

A filler used in this invention is preferably selected from the group consisting of oxides, hydroxides and carbonates containing a Group II element in the long periodic table. While it is not clearly elucidated why the use of these filler increases the strength of adhesiveness, the material having appropriate basicity is considered preferable for the filler used in the invention.

Group II elements in the long periodic table belong to the former Group IIA. The preferable element is magnesium, calcium or barium. They may take a form of complex oxide or complex hydroxide of a Group II element with another element such as aluminum and silicon (including those which can be expressed as a complex oxide or complex hydroxide in composition formula). A filler as defined herein is referred to as a "filler as defined in this invention".

Examples of a magnesium-containing filler include MgO, Mg (OH)$_2$, talc (2MgO—SiO$_2$(OH): magnesium silicate hydroxide), cordierite (2M gO—2Al$_2$O$_3$), magnesium meta-silicate and magnesium ortho-silicate. Among these, talc and cordierite are particularly preferable.

Preferable examples of a calcium- or barium-containing filler include carbonates such as calcium carbonate and barium carbonate.

A particle size of the filler as defined in this invention is generally 0.5 to 15 μm, preferably 5 μm or less.

Even a small amount of the filler as defined in this invention may improve adhesive strength to a certain extent if is present in the composition. Its content may be, therefore, more than zero to 100 parts by weight of the epoxy resin component, preferably at least 1 part by weight or more, more preferably at least 5 parts by weight or more, most preferably at least 10 parts by weight or more. The upper limit may be determined in consideration of the properties such as handling properties and physical properties. It is generally 200 parts by weight or less, preferably 100 parts by weight or less, particularly 50 parts by weight or less.

In this invention, another filler such as silica and alumina may be added if necessary. In general, the total amount of the filler as defined in this invention and the additional filler is 200 parts by weight or less, preferably 100 parts by weight or less, to 100 parts by weight of the epoxy resin component.

The composition of this invention may further comprise a silan coupling agent, a pigment, a surfactant, a preservative, a plasticizer, a lubricant, a defoamer and a leveling agent.

Examples of a silane coupling agent include, but not limited to, γ-aminopropyltriethoxysilan, γ-mercaptopropyltrimethoxysilan, γ-methacryloxypropyltrimethoxysilan, γ-glycidoxypropyltrimethoxysilan, SH6062 and SZ6030 which are available from Toray-Dow Corning Silicone Inc., and KBE903 and KBM803 which are available from Shin-Etsu Silicone Inc.

For the curing of the inventive cationically curable epoxy resin composition, the composition is subjected to the UV irradiation for appropriate period, e.g. 5 seconds to 5 minutes, to effect curing, and further subjected to heating under the temperature of 60° C. (degrees centigrade) to 180° C. (degrees centigrade), preferably 80° C. (degrees centigrade) to 150° C. (degrees centigrade) for appropriate period, e.g. 10 minutes to 4 hours, to effect the post-curing. Curing with the UV irradiation gives practically usable properties to the inventive composition. However, the additional curing with heat gives significant increase in durability such as adhesiveness (sealing properties) and water resistance to the composition. Thus, the present invention provides a composition having excellent durability while keeping a good workability intrinsic to a light curable resins.

The cationically curable epoxy resin composition of the present invention is especially useful as an adhesive in such application that at least one of two materials to be attached is alkaline glass or none-alkaline glass. Particularly, it is preferably used as an adhesive for semiconductor device package such as CMOS and the like.

EXAMPLE (1) Materials

The following materials were used in Examples and Comparative Examples.

Epoxy resin 1: a bisphenol-A type epoxy resin, RE-310S (Nippon Kayaku Co., Ltd.), which is a liquid at 25° C. with a viscosity of 13000 to 17000 mPa·s and an epoxy equivalent of 175 to 190 g/eq;

Epoxy resin 2: an alicyclic epoxy resin, bis(3,4-epoxycyclohexyl) adipate (Union Carbide Inc.; UVR-6128);

Epoxy resin 3: an alicyclic epoxy resin, UCB Chemical Corporation CAT002;

Epoxy resin 4: a hydrogenated bisphenol-A epoxy resin, EPI CLON EXA-7015 (Dainippon Ink And Chemicals, Incorporated) having an epoxy equivalent of 210 g/eq;

Epoxy resin 4: a dicyclopentadiene type epoxy resin, XD-1000 (Nippon Kayaku Co., Ltd.), having an epoxy equivalent of 240 to 260 g/eq;

Silane coupling agent: γ-glycidoxypropyltrimethoxysilan;

Polyol: polyether polyol, Sumiphen (TM of SUMITOMO BAY ER URETIIANE CO., LTD);

Silica: specific gravity 2.635, average particle size 1.5 micrometer;

Talc: specific gravity 2.70, average particle size 5 to 6 micrometer;

Cationic photo-initiator: mixture of the compounds represented by formulae (C-5) and (C-6), CYRACURE™ Photo-initiator UVI-6990 (Union Carbide Inc.);

Cationic thermal-initiator: following compound:

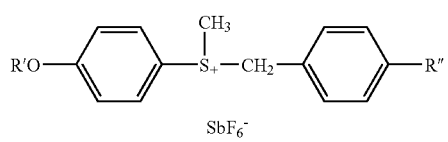

where R' and R" are alkyl etc., SI-60L (Sanshin Chemical Industries).

(2) Examples 1, Comparative Examples 1 to 4

The ingredients shown in Table 1 were blended to prepare a resin composition. On a glass plate was applied each resin composition to a thickness of 1 mm and the product was irradiated with light from its surface. A light source used was a medium pressure mercury lamp (Eyegraphics Co., HO15-L312), which was adjusted such that a light intensity at 365 nm was to be 150 mW/cm$^2$ as determined at 365 nm with a UV meter (Ushio UIT101). The irradiation time was 30 seconds. The total irradiation energy was 3600 mJ/cm$^2$. Thereafter post-curing was performed at 120° C. (degrees centigrade) for 1 hour. Cross hatch tape test (10×10 cuts) according to ASTM D3359 were conducted to thus-obtained samples for the evaluation of water resistance. The results were depicted in Table 1.

TABLE 1

|  | Example | Comparative Example | | | |
|---|---|---|---|---|---|
|  | 1 | 1 | 2 | 3 | 4 |
| Composition (wt %) | | | | | |
| Epoxy resin 1 (Aromatic type) | 69.5 | 69.5 | 74.0 | 76.9 | 86.0 |
| Epoxy resin 2 (Alicyclic type) | — | — | — | 10.0 | — |
| Epoxy resin 3 (Alicyclic type) | — | — | 1.5 | — | — |
| Silane coupling agent | 2.9 | 2.9 | 2.9 | 2.9 | 1.0 |
| Polyol | 6.0 | 6.0 | — | 7.5 | 10.0 |
| Talc | 19.0 | 19.0 | 19.6 | — | — |
| Silica | 1.0 | 1.0 | 0.4 | — | 1.0 |
| cationic photo-initiator | 1.1 | 1.6 | 1.6 | 1.4 | 2.0 |
| cationic thermal-initiator | 0.5 | — | — | 0.6 | — |
| Result of Cross hatch tape test | | | | | |
| Initial | 100/100 | 100/100 | 70/100 | 100/100 | 0/100 |
| After immersing in boiling water 30 min | 100/100 | 100/100 | 70/100 | 100/100 | — |
| boiling water 1 hour | 100/100 | 70/100 | 60/100 | 0/100 | — |
| boiling water 4 hour | 100/100 | 30/100 | 0/100 | — | — |

Using the compositions of Example 1 and comparative Example 2, cover glasses were adhered to CMOS packages to fabricate CMOS assemblies. Curing condition is the same as those used in Table 1, thus the total irradiation energy was 3600 mJ/cm$^2$. Typical evaluation tests for CMOS were conducted to the obtained CMOS samples.

TABLE 2

| CMOS reliability Test | Example 1 | Comparative Example 2 |
|---|---|---|
| Reflow three times JEDEC Level 3 condition | All pass | 41/45 |
| Gross leak test (125° C., 30 seconds) | All pass | 41/41 |
| Humidity test (85° C. 85% 168 hours) | All pass | 13/21 |
| Thermal shock test (125° C. to −40° C., 200 cycles) | All pass | 12/20 |
| Thermal cycle test (125° C. to −40° C., 200 cycles) | All pass | — |
| High temperature storage test (125° C., 168 hours) | All pass | — |
| Low temperature storage test (−40° C., 168 hours) | All pass | — |

Gross leak test in Table 2 was performed by measuring the gas leak when samples were immersed in a liquid of 125° C. for 30 seconds. The tests other than the gross leak test were performed by visual inspection after exposed to the test conditions and the occurrence of cracks and peeling, etc., were observed.

(3) Examples 2 to 4

The epoxy resins were changed and the ingredients shown in Table 3 were blended to prepare a resin composition. The curing condition is the same as that used in Table 1 except that UV light was irradiated at light intensity of 150 mW/cm$^2$ for the period until tack on the surface of the resin composition disappeared, which was shown in Table 3 as the energy required for the curing. The smaller energy means faster curing. The water resistance were evaluated by Cross hatch tape test as Example 1. The results were depicted in Table 3 with the result of Example 1. Thus, the use of alicyclic epoxy resins selected from the group consisting of hydrogenated bisphenol type epoxy resins and dicyclopentadiene type epoxy resins increases the curing rate of the composition while not deteriorating the adhesiveness.

TABLE 3

|  | Example | | | |
|---|---|---|---|---|
|  | 2 | 3 | 4 | 1 |
| Composition (wt %) | | | | |
| Epoxy resin 1 (Aromatic type) | — | 34.5 | — | 69.5 |
| Epoxy resin 4 (rapid curable type) | 65.5 | 34.0 | 38.5 | — |
| Epoxy resin 5 (rapid curable type) | — | — | 30.0 | — |
| Silane coupling agent | 2.9 | 2.9 | 2.9 | 2.9 |
| Polyol | 5.0 | 5.0 | 5.0 | 6.0 |
| Talc | 25.0 | 22.0 | 22.0 | 19.0 |
| Silica | — | — | — | 1.0 |
| cationic photo-initiator | 1.1 | 1.1 | 1.1 | 1.1 |
| cationic thermal-initiator | 0.5 | 0.5 | 0.5 | 0.5 |

TABLE 3-continued

| | Example | | | |
|---|---|---|---|---|
| | 2 | 3 | 4 | 1 |
| Tg of cured products (° C.) | 86 | 107 | 117 | 123 |
| UN energy necessary for curing (mJ/cm$^2$) | 1200 | 1800 | 1200 | 3600 |
| Result of Cross hatch tape test | | | | |
| Initial | 100/100 | 100/100 | 100/100 | 100/100 |
| After immersing in boiling water 30 min | 100/100 | 100/100 | 100/100 | 100/100 |
| boiling water 1 hour | 100/100 | 100/100 | 100/100 | 100/100 |
| boiling water 4 hour | 100/100 | 100/100 | 100/100 | 100/100 |

It will be apparent from the foregoing that many other variations and modifications may be made regarding the photo-setting resin component described herein, without departing substantially from the essential features and concepts of the present invention. Accordingly, it should be clearly understood that the forms of the inventions described herein are exemplary only and are not intended as limitations on the scope of the present invention as defined in the appended claims.

A cationically curable epoxy resin composition of the present invention is especially useful as an adhesive when at least one of two materials to be attached is a glass, particularly as an adhesive for semiconductor device package such as CMOS, CCD and the like.

What is claimed is:

1. A cationically curable epoxy resin composition comprising:
   (a) an epoxy resin component comprising the combination of bisphenol A epoxy resin, hydrogenated bisphenol A epoxy resin and dicyclopentadiene epoxy resin;
   (b) a cationic photo-initiator;
   (c) a cationic thermal-initiator; and
   (d) a filler selected from the group consisting of oxides, hydroxides and carbonates, each containing a Group II element in the long periodic table.

2. A composition according to claim 1, wherein the composition comprises 0.1 to 10 parts by weight of cationic photo-initiator, 0.01 to 5 parts by weight of the cationic thermal-initiator and 1 to 100 parts by weight of the filler each based on the 100 parts by weight of the epoxy resin component.

3. A composition according to claim 1, wherein the cationic photo-initiator is a salt represented by $A^+B$ which produces cationic active species by irradiation of light; the cation $A^+$ selected from the group consisting of aromatic iodonium ions and aromatic sulfonium ions.

4. A composition according to claim 3, wherein the anion B in the cationic photo-initiator is selected from the group consisting of $SbF_6$; $PF_6$; $AsF_6$; $BF_4$ and $B(aryl)_4$.

5. A composition according to claim 1, wherein the cationic thermal-initiator is a salt represented by $A^+B$ which produces cationic active species by heat; the cation $A^+$ is selected from the group consisting of sulfonium ions in which at least one among three groups bonding to the S-atom is alkyl group and sulfonium ions in which two among three groups bonding to the S-atom form together an alkylene group to form a ring with S-atom.

6. A composition according to claim 5, wherein the anion B in the cationic thermal-initiator is selected from the group consisting of $SbF_6$; $PF_6$; $AsF_6$; $BF_4$; and $B(aryl)_4$.

7. A composition according to claim 1, further comprising a polyol compound.

8. A composition according to claim 1, wherein the Group II element in the filler is selected from the group consisting of magnesium, calcium and barium.

9. A composition according to claim 8, wherein the Group II element in the filler is magnesium.

10. A composition according to claim 1, wherein the filler is selected from the group consisting of MgO, Mg(OH)$_2$, talc, cordierite, magnesium meta-silicate and magnesium ortho-silicate.

11. A semiconductor device package comprising at least two substrates, at least one of which being constructed from glass, sealed by the product of UV radiation exposure on the composition of claim 1.

* * * * *